United States Patent
Rath et al.

(10) Patent No.: US 8,719,723 B2
(45) Date of Patent: May 6, 2014

(54) DISPLAYING DATA SENSITIVE TARGETS

(75) Inventors: Thomas Rath, Slangerup (DK);
Kristian Tørning, København (DK)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 11/682,148

(22) Filed: Mar. 5, 2007

(65) Prior Publication Data
US 2008/0218530 A1 Sep. 11, 2008

(51) Int. Cl.
*G06F 3/048* (2013.01)

(52) U.S. Cl.
USPC ............................ 715/773; 715/745; 715/708

(58) Field of Classification Search
USPC .................. 715/702, 745, 773, 811, 864, 708
See application file for complete search history.

(56) References Cited

U.S. PATENT DOCUMENTS

| | | | | |
|---|---|---|---|---|
| 5,267,171 A * | 11/1993 | Suzuki et al. | .................. | 700/234 |
| 5,574,482 A | 11/1996 | Njemeier | | |
| 5,818,437 A * | 10/1998 | Grover et al. | ................. | 715/811 |
| 5,821,881 A | 10/1998 | Fischer et al. | | |
| 6,169,538 B1 * | 1/2001 | Nowlan et al. | ................ | 345/168 |
| 6,624,831 B1 * | 9/2003 | Shahine et al. | ............... | 715/815 |
| 6,661,409 B2 | 12/2003 | Demartines et al. | | |
| 6,704,006 B2 | 3/2004 | Cherry et al. | | |
| 6,734,881 B1 * | 5/2004 | Will | ............... | 715/811 |
| 6,744,427 B2 | 6/2004 | Maglio et al. | | |
| 6,882,337 B2 * | 4/2005 | Shetter | ........................... | 345/173 |
| 6,885,318 B2 | 4/2005 | Bickerton | | |
| 6,980,200 B2 * | 12/2005 | Goren | .......................... | 345/169 |
| 7,002,553 B2 | 2/2006 | Shkolnikov | | |
| 7,071,924 B2 | 7/2006 | Wilbrink et al. | | |
| 7,243,307 B2 * | 7/2007 | Gao et al. | ...................... | 715/744 |
| 7,454,713 B2 * | 11/2008 | Spalink et al. | ................ | 715/828 |
| 7,546,548 B2 * | 6/2009 | Chew et al. | .................... | 715/810 |
| 2003/0067495 A1 * | 4/2003 | Pu et al. | ......................... | 345/811 |
| 2004/0169597 A1 * | 9/2004 | Mulder et al. | ................ | 341/158 |
| 2004/0183834 A1 * | 9/2004 | Chermesino | .................. | 345/773 |
| 2004/0212595 A1 | 10/2004 | Zhou | | |
| 2004/0239624 A1 | 12/2004 | Ramian | | |
| 2005/0140661 A1 | 6/2005 | Collins | | |
| 2006/0050142 A1 * | 3/2006 | Scott et al. | ................. | 348/14.05 |
| 2006/0187483 A1 * | 8/2006 | Baba | ........................... | 358/1.15 |
| 2006/0253793 A1 * | 11/2006 | Zhai et al. | ..................... | 715/773 |
| 2007/0083827 A1 * | 4/2007 | Scott et al. | ..................... | 715/811 |
| 2007/0245259 A1 * | 10/2007 | Carlson | ......................... | 715/773 |
| 2008/0033713 A1 * | 2/2008 | Brostrom | ......................... | 704/9 |
| 2009/0199092 A1 * | 8/2009 | Ghassabian | .................... | 715/261 |

OTHER PUBLICATIONS

Oniszezak, et al., A Comparison of Two Input Methods for Keypads on Mobile Devices http://delivery.acm., Oct. 27, 2004, NordiCHI, Tampere Findland, 4 pages.

Ryu, et al., LetterEase: Improving Text Entry on a Handheld Device Via Letter Reassignment, Nov. 23-25, 2005, Canberra Australia, 10 pages.

Goldstein, Cassiopeia BE-300—Review, http://www.usedhandhelds.com/usedhh_reviews_be300.asp, Nov. 2001, last accessed on Mar. 5, 2007, 5 pages.

* cited by examiner

*Primary Examiner* — Amy Ng
*Assistant Examiner* — Di Xiao
(74) *Attorney, Agent, or Firm* — Leonard Smith; Mike Allen; Micky Minhas

(57) ABSTRACT

Users are often in environments that require specific inputs into a device. However, it can be advantageous to display a limited number of targets to a user for inputting information. Therefore, the can be a selection of a limited target set based on a user activity and/or environment. The limited target set can be display to a user through a display, commonly a visual display.

16 Claims, 17 Drawing Sheets

| F1 | F2 | F3 | F4 | F5 | F6 | + | - | PgUp | EXIT |
|---|---|---|---|---|---|---|---|---|---|
| F7 | F8 | F9 | F10 | F11 | F12 | / | * | PgDn | Insert |
| 1 | 2 | 3 | 4 | 5 | 6 | 7 | 8 | 9 | 0 |
| q | w | e | r | t | y | u | i | o | p |
| a | s | d | f | g | h | j | k | l | ; |
| z | x | c | v | b | n | m | , | . | ? |
| Caps | Ctrl | Alt | Space |||||| Tab |
| Shift | Fn | Del | Escape | Backspace |||||||
| Arrow up | Arrow down | Arrow left | Arrow right | Enter ||||||

1300

| A | B | C | D | EXIT |
|---|---|---|---|---|
| E | F | 1 | 2 | Enter |
| 3 | 4 | 5 | 6 | Del |
| 7 | 8 | 9 | 0 | Space |
| Up | Down | Left | Right | Tab |

DISPLAYING DATA SENSITIVE TARGETS

TECHNICAL FIELD

The present specification relates generally to data entry and in particular to optimizing screen display size for data entry.

BACKGROUND

In recent decades, microprocessor-based devices have become an important tool in society. The impact of these devices transcends many disciplines ranging from business transactions (e.g., two bank networks completing a monetary wire transfer) to interpersonal communications (e.g., an e-mail correspondence between two individuals). As importance of these devices grows, technology that develops around them also grows. The technological developments also transcend many disciplines, including both hardware and software innovations.

One area of technology that had major developments in recent years is miniaturization. For example, one of the most well documented developments of miniaturization occurred with cellular telephones. In the 1980s, cellular telephones were large heavy devices commonly referred to as "bricks." A "brick" was much larger than an adult person's hand and weighed about 900 grams. In contrast, cellular telephones can fit within an adult person's clasped hand and can weigh about 40 grams. The decreased size and weight of microprocessor-based devices makes their use and possession easier and more of a part of a user's everyday life.

As these devices become smaller, specific components of the devices also become smaller. Two areas that become smaller are the buttons of the device and the display of the device. A device can display a digital keyboard placed on a liquid crystal display (LCD) screen. A plurality of keys is presented that are similar to keys found on a standard computer keyboard. A user engages these keys by touching on them with a stylus. When the user touches the key, an appropriate response takes place in accordance with they key (e.g., touching a target that has a letter 'q' places a 'q' in a desired location). No actual key is present, only a digital representation of a key on a LCD display.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The subject matter disclosed and claimed herein, in one aspect thereof, comprises displaying less then a full amount of targets based on a user's specific situation. For example, a conventional full target set displayed on portable electronic device contains about seventy-five targets, even though the size of the display area is a few inches. In contrast, the claimed subject matter displays only a limited number of targets to a user based on a specific application performed by the user. A limited display can take up the same space as a full display. Each target becomes larger in size if it is part of a limited display as compared to a full display.

Accordingly, a user can become more efficient at entering data when an area the user is attempting to target is larger, and there are less irrelevant choices to obfuscate the intended target. The subject specification describes employing a larger target space for a user to touch respective targets, and thus providing greater room for error in the event the user does not contact a center of a desired target. In addition, it eliminates navigating among numerous non-relevant targets because such targets are masked from display. The user should still have complete control over what display he/she uses, so various checks and overrides can take place to make sure a user is presented with a display that he/she wants to use and will be efficient at using.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 13 illustrates an example representation of a standard display configuration and a limited display configuration.

DETAILED DESCRIPTION

Figure 1:
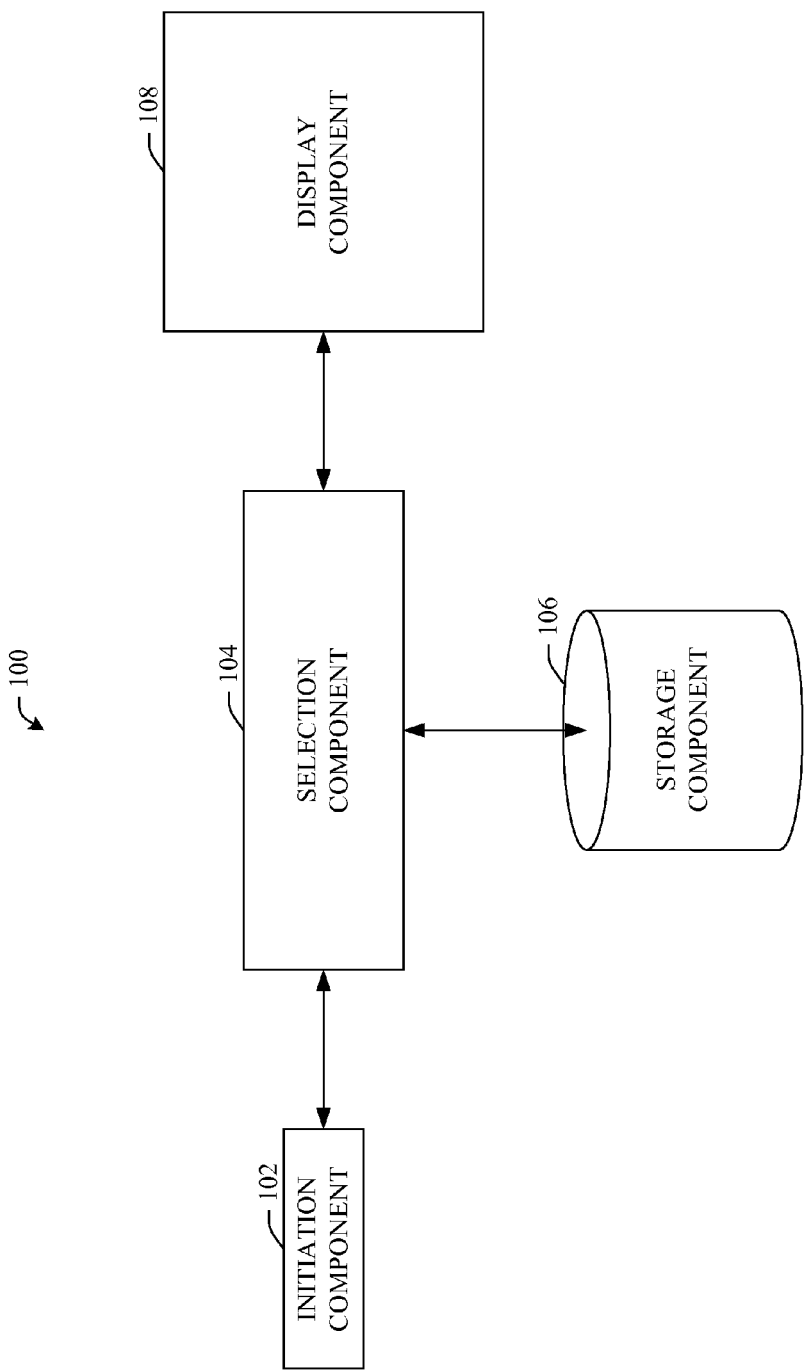
FIG. 1 illustrates an example system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter. The terms 'target', 'key', and the like are to be used interchangeably, even when integrated into other words (e.g. 'keyboard' is to be used interchangeably with 'targetboard'). The terms 'subset', 'set', and the like are to be used interchangeably.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 in accordance with the subject specification. An initiation component 102 can send a command to a selection component 104 for the selection component 104 to engage. For example, there can be a command sent by the initiation component 102 that a limited target set (e.g., less then a full target set) should be produced to a user on a display. This command can contain various information, including specifically what targets should be displayed or a general theme in which the selection component 104 can make a decision as to what targets should be displayed. Targets are any area in which a user is can touch, wherein the touching of the target attempts to facilitate an action. In most instances, targets can be input targets (e.g., when touched, a character represented by the input target is inputted into a system). For example, a user touches a portion of a screen integrated with a target. Touching the targets engages an action associated with the target (e.g., deleting a letter on a word processing document when touching a 'del' target).

The initiation component 102 can start through a number of different ways. In one embodiment, an automated system creates an initiation for a specified display. For example, a user can be entering information into an electronic form, such as a word processing document. An entry on the form can require entry of a numerical date. Since it is predetermined that a number will be entered, numerical characters should be shown on a user's display and other characters would likely not be shown on a display (e.g., a '+' sign). Therefore, the initiation component 102 can recognize numerical characters are appropriate and send a command to the selection component 104 to create a limited target set with numerical characters. This can be performed automatically, meaning when a numerical date is to be entered, a displayed target set switches from a full target set to an appropriate limited target set. When date entry is complete, the display returns to a full target set. In another embodiment, the user sends a command requesting a limited display. For example, a user can be making entries in hexadecimal form (e.g., only entering 0-9 and A-F). The user can send a request to an initiation component 102 for a limited display of hexadecimal targets and the initiation component 102 can follow this command.

Once initiation takes place, a selection component 104 selects the targets to make up a selected display. In common operation, there are a large number of available targets stored in a storage component 106. The selection component 104 chooses targets from the storage component 106 based on information received from the initiation component 102. The selection can be considered intelligent because it makes determinations from information on the user activity. For example, the selection component 104 would retrieve information about numerical targets stored in the storage component 106.

In one embodiment, the information retrieved is computer code necessary to create an individual target. Selection should take place in conjunction with a user activity. For example, if a user scans a barcode for shipping purposes, then the selection component 104 should select a limited target set based of the user activity (e.g., the activity of tracking shipments). This allows for presenting a limited target set to a user that is appropriate for the activity in which he/she is engaging. The selection component bases its selections off characteristics of a user's activity (e.g., that the user is scanning things and a characteristic of the activity is a price needs to be set).

In one embodiment, the selection component 104 selects a specific set of targets determined from a command sent by the initiation component 102. However, the selection component 104 does not have to use targets (e.g. code) stored in the storage component 106 in creating a target subset. The selection component 104 can have a capability for creating targets. Thus, the storage component 106 contains information relating to the symbol 'A' and the symbol 'a'. The selection component 104 finds information about targets for these symbols from the storage component 106. The selection component 104 can create a target representing both of the symbols (e.g., the user just selects the target and the selection component 104 uses artificial intelligence to determine if an 'a' or an 'A' should input). Creating a target can include designing the physical representation as well as determining what function will take place if a user engages in a created target. In a further embodiment, a selection component 104 can create specialty targets. For example, in the program Microsoft Word, to operate a copy command a user pushes both a 'Ctrl' target as well as a 'C' target. A selection component 104 can create a target specifically for copying.

In another embodiment, the selection component 104 uses internal logic for determining the targets to display. For example, an initiation can instruct the selection component 104 to create a display of hexadecimal targets. However, it can also be beneficial to have other targets presented to a user (e.g. a delete target or a space creation target). The selection component 104 can choose other targets that can work well with a particular arrangement using internal logic. In a further embodiment, the selection component 104 can use information relevant to a user location in making a selection. For example, if a user is in a warehouse known to the system (e.g. a warehouse owned by a company that has servers integrated with a device containing the system 100), then the selection component 104 can display relevant environmental information (e.g. shipping information based on the warehouse).

Selected targets can be presented to a user through a display component 108. The display component 108 commonly displays the selected targets in the same area as it would display all targets. An example of a display component is a liquid crystal display (LCD) screen. Targets presented to a user should be targets selected by the selection component. In addition, at least one target presented by the display component should be a symbol target. A symbol encompasses pictures as well as graphemes. A grapheme is any atomic unit in a written language. Examples of graphemes are letters, Chinese characters, Japanese characters, numerals, and punctuation marks. A grapheme target is a target that when engaged displays an appropriate grapheme.

For example, a user can have a personal digital assistant enabled with features of the subject specification. The personal digital assistant can have a scanner that can read a bar code. A program requires that every time a bar code is read, a numerical price should be inputted and stored in system memory. Since the system 100 knows numerical entries are what a user will enter, numerical targets and closes related targets (e.g., an 'Enter' target) display to a user. This allows a user to have to function around targets they will likely use. This integrates the selection with the user activity (e.g., the reading of bar codes and entering the price).

The subject specification describes synchronized input from a device user. Due to miniaturization of electronic devices, a typical screen associated with these devices can be relatively small. For example, personal digital assistants normally have a screen size of only a few square inches or less; therefore, the relatively small size creates a premium for screen real estate (e.g. the smaller the screen, the more important the size of items on the screen). Many people use personal digital assistants for creating electronic word processing. In displaying the typical document, the screen divides into thirds where the top two-thirds display the document, while the bottom third presents a keyboard, where keyboard is one type of target set.

In a common Latin based (e.g., English) keyboard, there are about seventy-five keys. These keys represent characters ranging from letters (e.g., A, B, C, etc.), numbers (e.g., 1, 2, 3, etc.), symbols (e.g., +, −, ?, etc.), and commands (e.g., Tab, Shift, Enter, etc.). However, there can be several hundred keys available if a system has the ability to produce both accented characters as well as non-Latin based characters (e.g. Greek language characters, Korean language characters, etc.). Using a typical English keyboard, if a screen is two inches by three inches, then only two square inches are dedicated to the display of seventy-five keys. For most individuals, operation of a keyboard becomes difficult in a small area. Typically, the user has a small stylus specifically designed for his/her device in which he/she points and touches a key with the stylus to place the representative character in the document.

Employment of Fitt's law shows that a full keyboard configuration is not optimal. Fitt's law predicts the amount of time it takes to complete an action based on target size and a distance between target centers. According to Fitt's law, increasing a target size on a keyboard increases productivity. Therefore, the subject specification discloses showing larger targets (e.g., keys) in an area then with a full keyboard. Displaying specific Some systems are pre-programmed to display limited targets. For example, when a user is to enter a pin number at an automated teller machine (ATM), the user can be displayed numbers and other relevant buttons. However, this does not take into account specific characteristics of the user activity because the ATM is pre-programmed. For example, a person's password can be three letters, two numbers, and then three letters (e.g., abc12xyz). A selection component 104 operates to provide targets that are relevant to entering text. Once a user enters a third letter, the selection component 104 operates to provide targets that are relevant to entering numbers Once numbers are entered, the display returns to a text friendly display. After the password is entered, a full target set emerges on a display. If a different user has a different formatted password (e.g., 123abc4d), then the targets displayed can change for their password. Therefore, the subject specification uses characteristics of a user's activity (e.g., what will be entered in that specific instance) in determining displayed targets.

Figure 2:
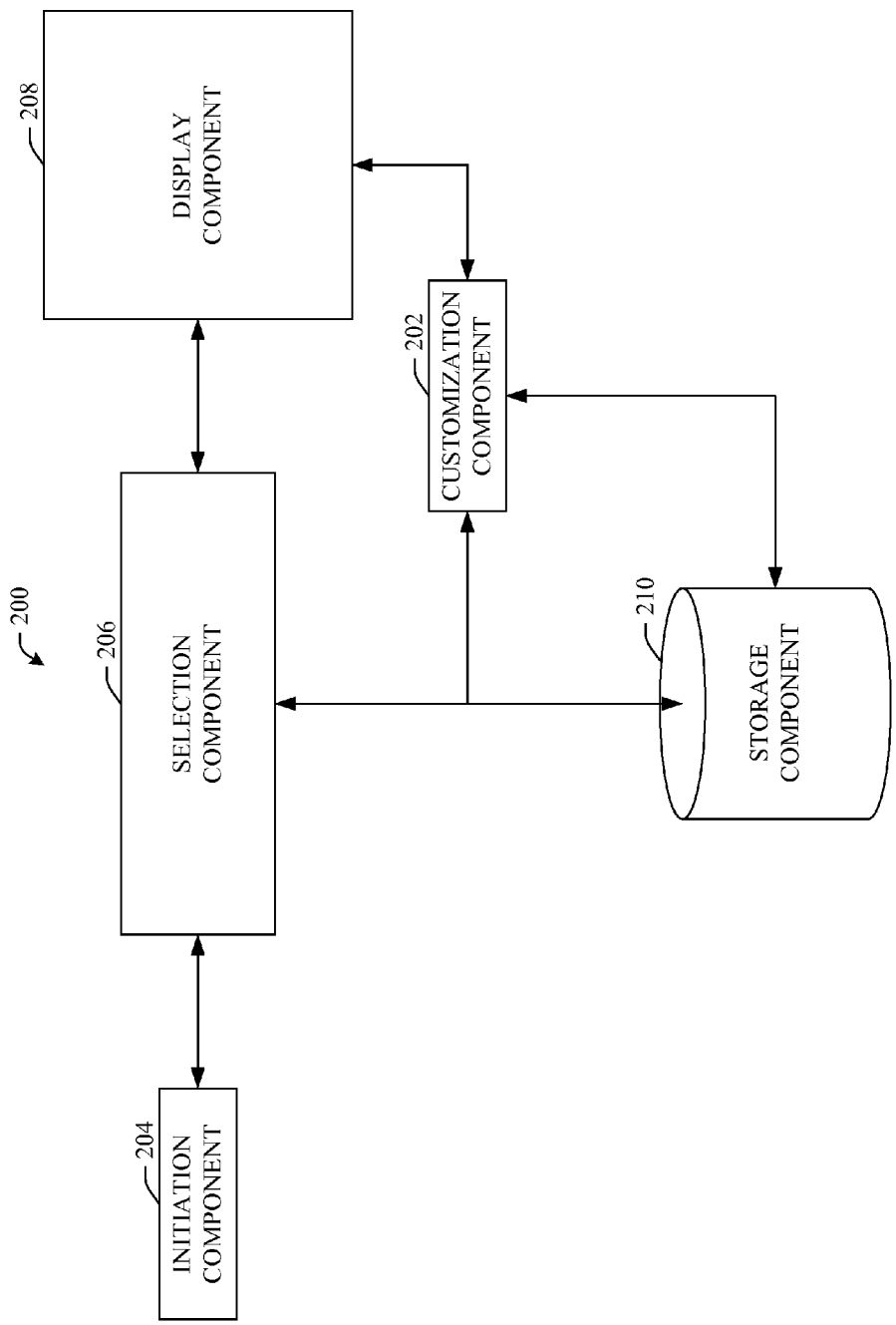
FIG. 2 illustrates an example system with a customization component in accordance with an aspect of the subject specification.

FIG. 2 discloses an example system 200 with a customization component 202. An initiation component 204 sends a command to a selection component to display select targets. The selection component 206 engages with a customization component 202 to gain input from a user about a limited target display. In common operation, a user interface appears on a display component 208 in which a user can interact. Thought interaction, a user can provide information thought the customization component 202 as to what targets he/she would like displayed. Though communication takes place with the customization component 202, in common operation communicated information passes from the customization component 202 to the selection component 206. Armed with the information gathered through the customization component 202, targets are still gathered by selection component 206.

In one embodiment, the customization component 202 can be a series of pre-set questions to the user. Answers to the questions can allow the selection component 206 to make a better choice for targets. For example, there can be an initiation that only alphabetical characters need to be displayed. However, the system can be configured to operate in a number of different languages. Therefore, it can be beneficial to display a question of in what language the user would like characters displayed. Based on the answer to the question, the selection component 206 can select targets that follow in line with answers to presented questions from a storage component 210.

In another embodiment, the customization component 202 can be open ended, where a user selects keys from the storage component 210. The customization component 202 can merely ask a user to select which targets he/she would like displayed. The user can use the display component 208 to select any targets for displaying. Furthermore, the system can be configured to choose both user-selected targets as well as other targets. For example, a user may select ten numbers (e.g., 0-9) from the storage component 210 for displaying in a limited target subset. However, without a closing target, the user can have difficulties exiting a limited target display.

Therefore, the selection component 206 can display not only user-selected targets, but also targets that would be of general use (e.g., a closing target). The user can create a customization that does not allow for system-added targets.

This example displays a principle of two limited target sets. A first limited target set can be what is selected by the selection component. For example, the can be the closing target. However, what is ultimately displayed to the user through the display component is a second limited target set. The second limited target set can contain both what was selected by the selection component (e.g., what is in the first limited target set) as well as what was selected by the user through the customization component. At least one target of the second limited target set should be a grapheme input target. It is possible that the first limited target set and the second limited target set be the same. This can take place when the user does not enter and specific targets or a system done not have a customization component (e.g., as displayed in FIG. 1). However, at least one target of the second limited target set should still be a grapheme input target.

In a further embodiment, the customization component 202 can be used to create a new pre-set configuration that can be accessed at a later time. Once a user chooses specific targets, the customization component 202 can ask a user if they would like to save the chosen targets as a configuration for later use. For instance, a user can use only numbers with completing shipping invoices. When the user selects what targets he/she would like to use, there can be a desire by the user to save this selection for another time (e.g., saving a configuration as 'shipping'). This saves the user time because he/she does not need to select targets each time they want a specific configuration. The user can save the configuration in the storage component 210. When the user makes an initiation later, he/she can signal to the initiation component that he/she would like to use 'shipping'.

Figure 3:
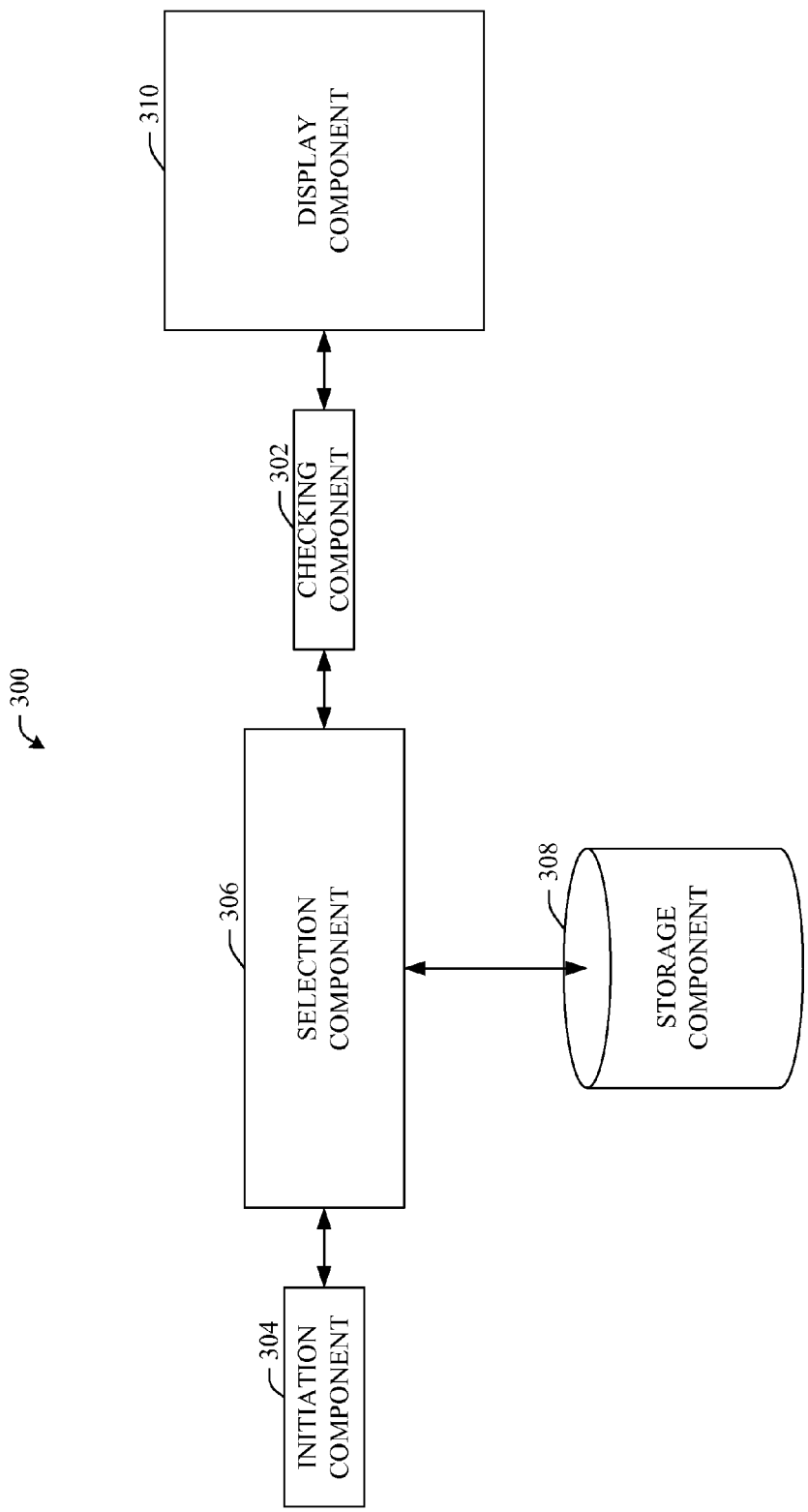
FIG. 3 illustrates an example system with a checking component in accordance with an aspect of the subject specification.

FIG. 3 discloses an example system 300 with a checking component 302. An initiation component 304 sends a command to a selection component 306 to gather targets in order to display a subset of targets. The selection component 306 selects targets from a storage component 308 and creates a limited target configuration. This selection can take place from a number of different embodiments. A provisional displaying of selected targets takes place to a user through a display component 310. The checking component 302 asks a user if this is a configuration they want displayed. If the user confirms that this is a display he/she wants, then a display can occur of selected components through the display component 310. In one embodiment of the subject specification, a log of this event can store into the storage component 308.

In one embodiment of the subject specification, if the user rejects a selected display, then the selection component 306 attempts to select a new configuration. The selection component 306 can contain logic that can determine another selection of targets that is different from an original selection. The selection component 306 can repeat this until the user approves of a selected display or display generations can stop after a specific number of rejections (e.g. five rejections). In another embodiment, if the user rejects a display, then the selection component displays a full keyboard without any target limitation.

In a further embodiment, if the user rejects the selected display, then there can be a requirement for the user to select targets. This embodiment would likely use features disclosed in the customization component 202 of FIG. 2. Once the user rejects a target configuration, the customization component 202 of FIG. 2 engages the user to select what targets he/she would like displayed. In another embodiment, if a user rejects a limited target set, the checking component 302 can inquire as to why the user rejected the limited target set. The selection component 306 can use the responses for the user in creating a different limited target set.

Figure 4:
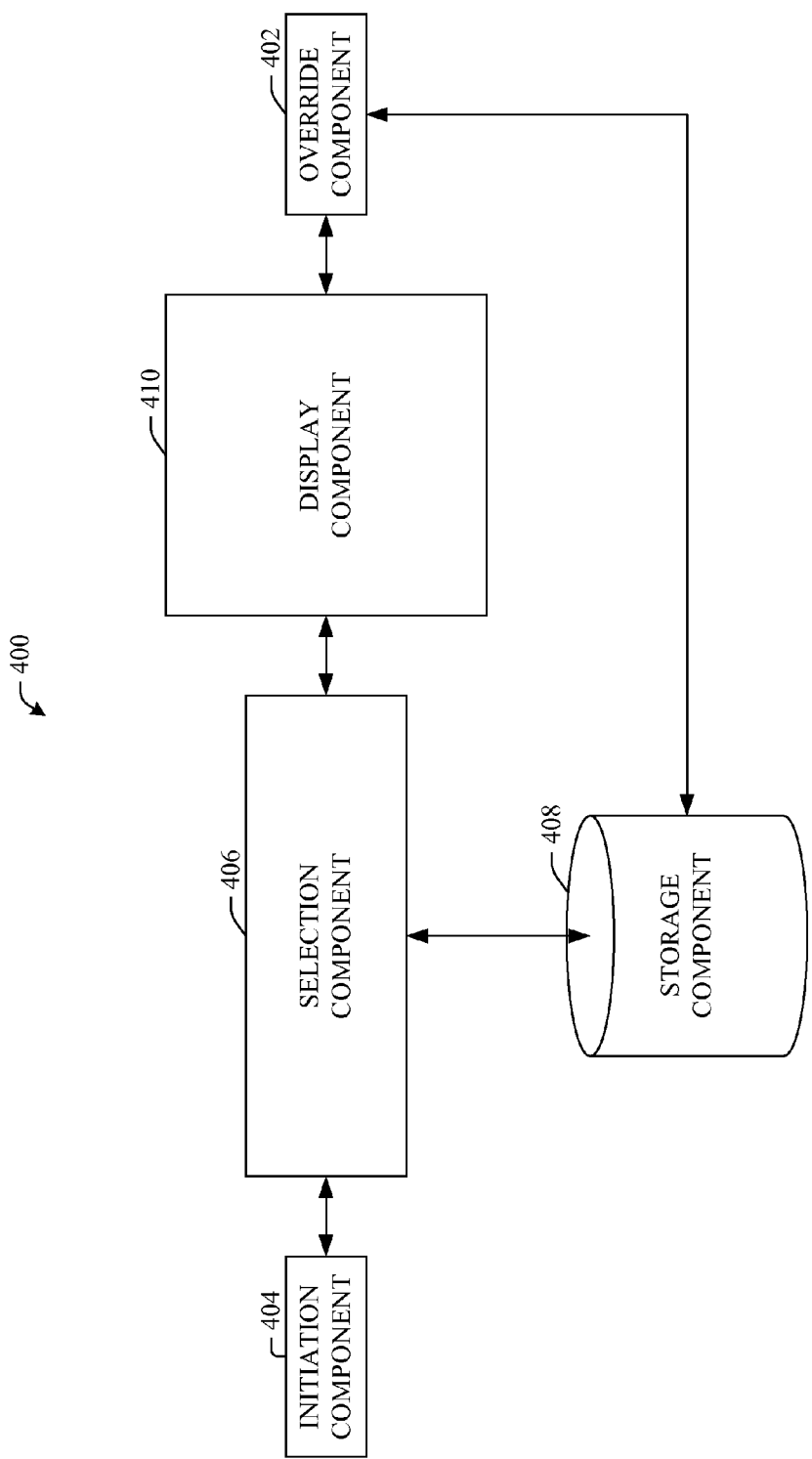
FIG. 4 illustrates an example system with an override component in accordance with an aspect of the subject specification.

FIG. 4 discloses an example system 400 with an override component 402. An initiation component 404 sends a command to a selection component 406 to select a limited number of targets. The selection component 406 retrieves stored targets from a storage component 408 and displays these targets on a display component 410. The retrieval of targets by the selection component 406 is commonly facilitated by the command from the initiation component 404. An override component 402 presents an option to a user for eliminating a target subset and returning to a full target set.

The override component can take shape in several different fashions. In one embodiment, the override can simply reject a selected target set and display a full target set. This can be done though a cancel target that is part of the limited target set. In another embodiment, the override component reconfigures the display (e.g., re-orders an arrangement of targets). Override can be logged into memory of the storage component 408 and the selection component can use logs of rejections when selecting later target configurations. The override component differs slightly from the checking component 302 of FIG. 3. For example, the selection component does not provisionally display a selected target set; it displays a target set and the override component rejects the set after displaying. However, the features of each component can integrate together and they can work in conjunction with one another.

Figure 5:
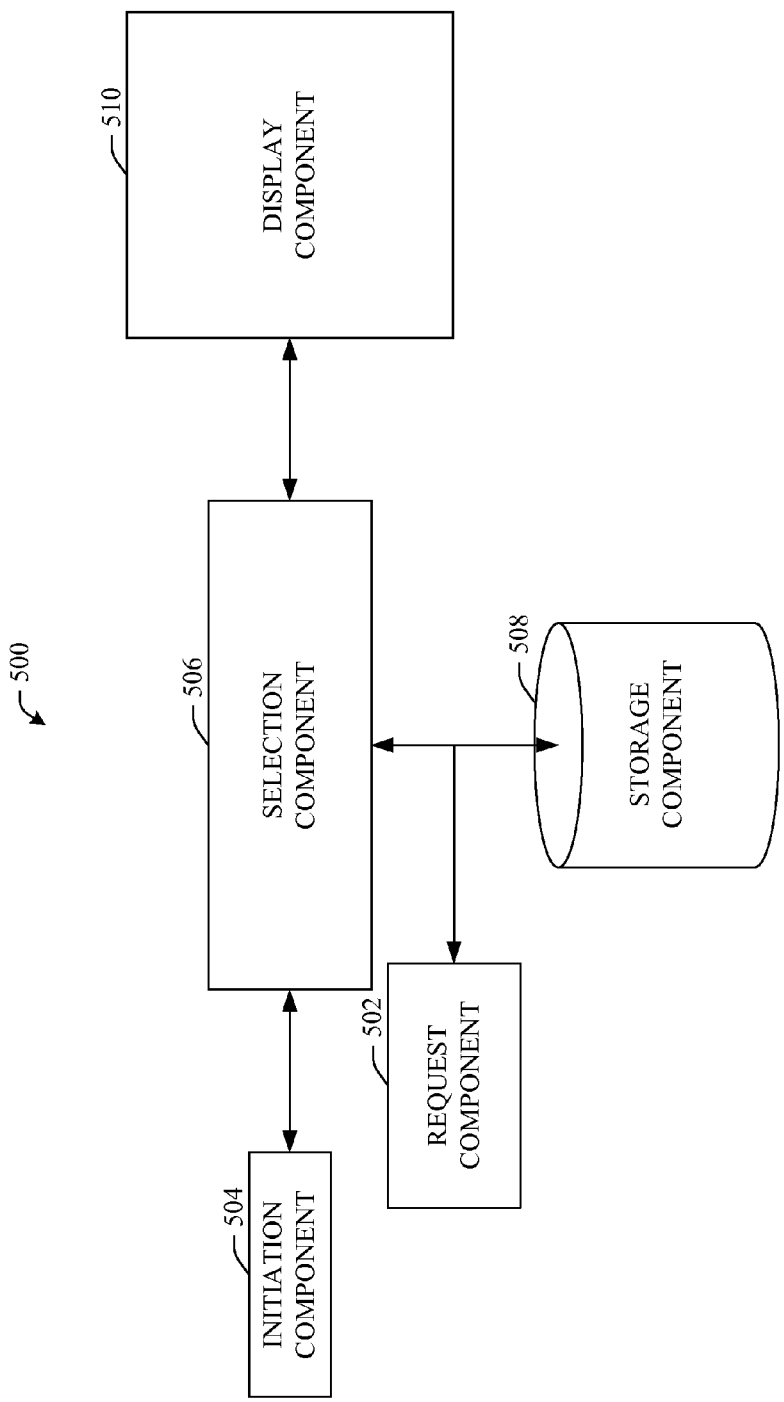
FIG. 5 illustrates an example system with a request component in accordance with an aspect of the subject specification.

FIG. 5 discloses an example system 500 with a request component 502. An initiation component 504 sends an instruction to a selection component 506 to display a limited set of targets. The selection component 506 engages a request component 502 asking a user for input toward target selection. Usually based on at least some user input, the selection component 506 retrieves targets from a storage component 508. Retrieved storage components are displayed to a user through a display component 510.

The request component 502 can have various different forms of functionality. In one embodiment, a user can be shown a sample target set and the user can accept or deny the sample target set. This differs from the checking component 302 in FIG. 3 because the sample target set might not be the same set ultimately displayed. For example, the request component 502 could only show an outline of what targets would look like without any actual targets being shown (e.g., the request component 502 shows what fifteen targets would look like as opposed to a full sixty target set). In another embodiment, the request component 502 asks a user if he/she would like a limited target set and the user can accept or deny a request. This would take place without retrieving targets from the storage component 508

Furthermore, the request component 502 can configure to keep a log of the user response in the storage component 508. This log can be used for both record keeping as well as for modification of personal settings. For example, a person could log onto a device with the system 500 under a username and password. The user could deny a request to have a limited target set displayed. A record of this denial could store into a location of the storage component 508. The system 500 can have the capabilities that if a specific user denies a request after a certain number of times (e.g., five denials), then selection of limited targets will not take place. Therefore, when the specific user engages a device with the system 500, the system 500 automatically displays a full target set. The system 500 can have features that allow this automation to be undone.

Figure 6:
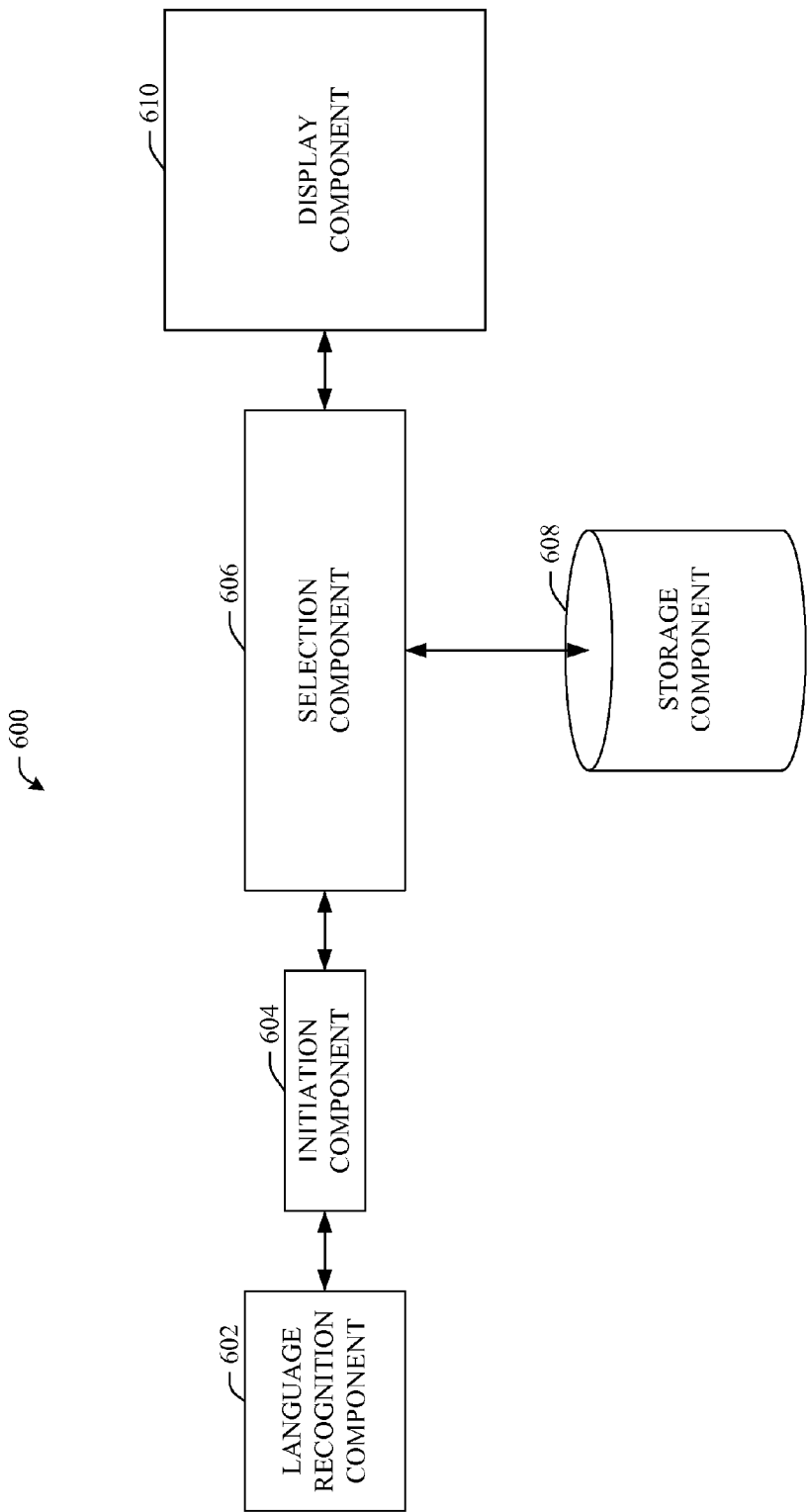
FIG. 6 illustrates an example system with a language recognition component in accordance with an aspect of the subject specification.

FIG. 6 discloses an example system 600 with a language recognition component 602. A user can speak into a device (e.g. a personal digital assistant/cellular telephone) with the system 600 requesting an initiation. For example, a user can state that they would like to enter text. However, it is possible that the user will enter this information (e.g., speak) in a variety of languages. For example, while a device could be designed and manufactured in the United States, use of the device can take place throughout the world. A Russian-speaking user could make a verbal request to enter text in Russian. The language recognition component 602 can recognize not only what was said, but also identify what language a user spoke. Based on this, the language recognition component 602 can instruct an initiation component 604 to send a command to a selection component 606 to select only Russian characters. The selection component 606 selects Russian characters from the storage component 608 and displays the characters on a display component 610. Other features can integrate with the language recognition component 602, such as an override component 402 in FIG. 4.

In another embodiment, the language recognition component 602 can make language determinations based of textual factors. For example, a user can scan an item barcode with a personal digital assistant equipped with the system 600. The bar code can be from an item made in Japan and the bar code can contain this information. Based on the information, the language recognition component 602 can instruct an initiation component 604 to create a command for a target set based off Japanese language characters.

In a further embodiment, the language recognition component 602 can make language determinations based on global positioning. For example, a user can be at an oil refinery in Kuwait performing maintenance tasks. The language recognition component 602 can determine that the user is in an Arabic nation and instruct the initiation component 604 to run a command for a display of Arabic characters. In addition, there are some locations where multiple languages are appropriate. For example, Puerto Rico is a United States territory; there is an English language influence as well as a Spanish language influence. The language recognition component 602 can use global positioning that both languages could be appropriate. A user can be prompted with English characters, Spanish characters (e.g., some accented characters), or a combination of both. In addition, the language recognition component 602 can ask a user which language they would like to use.

Figure 7:
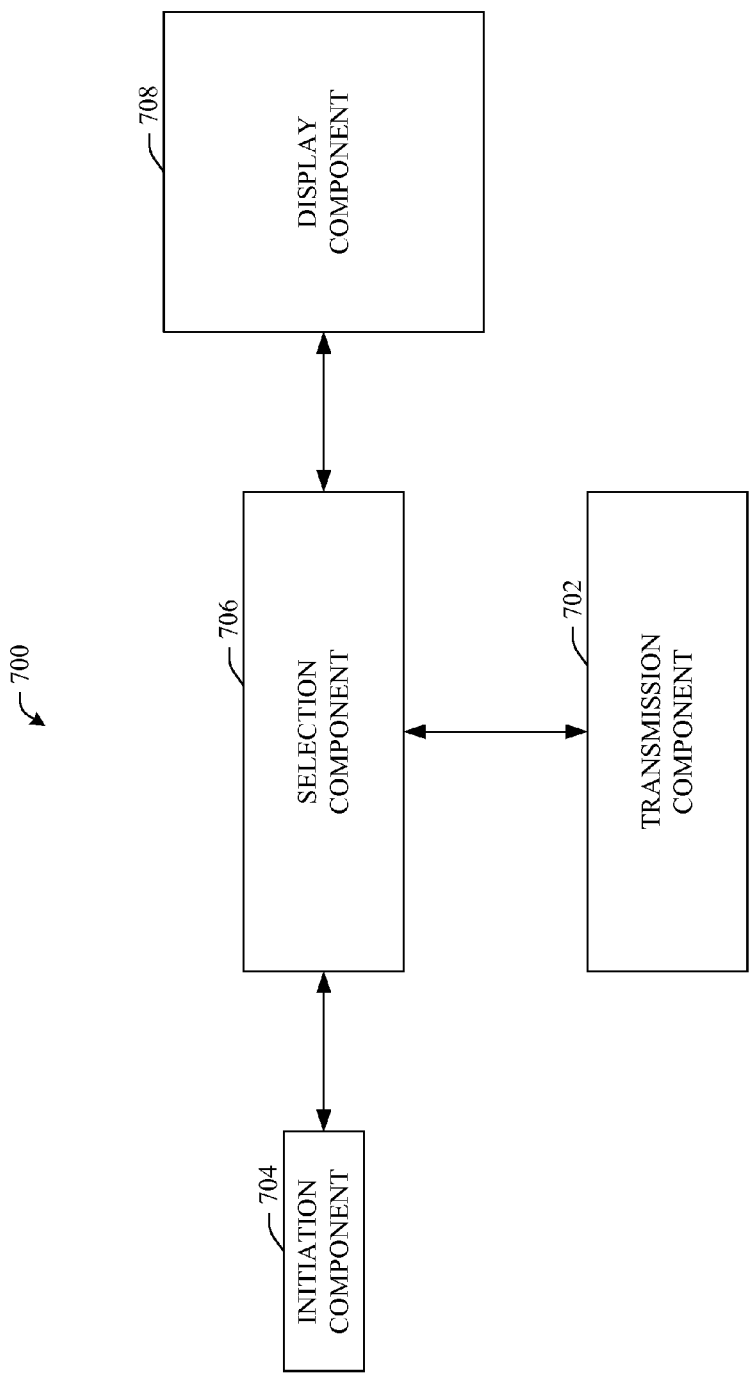
FIG. 7 illustrates an example system with a transmission component in accordance with an aspect of the subject specification.

FIG. 7 discloses an example system 700 with a transmission component 702. An initiation component 704 sends a command to a selection component 706 to choose a limited target set. The selection component 706 can interact with a transmission component 702 to retrieve targets. The transmission component 702 can connect with a plurality of storage locations worldwide. Thus, the selection component 702 can select targets from a plurality of locations. The selection component 706 transfers the limited target set to a display component 708

For example, the system 700 could be located on a device that can connect to the Internet. During operation of the device, a user is off-site at a remote location. It can be desirable to limit the size of the device and one way to limit size is to remove memory from the device. Thus, the selection component 706 would have no internal storage component from which to draw targets. The transmission component 702 allows the selection component to select targets from a database located at a corporate headquarters. Therefore, the user of the device can have a wide array of targets available without needing the targets stored on the system 700. Even if the possible targets are in the thousands or more, the display component could display all of these using a scroll feature (e.g., while all targets are not on the display component 708 at the same time, they are available at one time by using a scroll mechanism).

In another embodiment, the transmission component 702 can configure to overcome language barriers. For example, there can be a situation where a user cannot speak the language in which the device is configured. The transmission component 702 can communicate with other devices to attempt to find targets relating to the language. This can be useful for more obscure languages or specific language dialects.

In a further embodiment, the transmission component 702 communicates information to a server about various aspects of the subject specification. For example, the selection component 706 can communicate what targets it ultimately displayed though the display component 708. In addition, the selection component 706 can retrieve targets that it does not ultimately use. Therefore, the selection component 706 can transmit through the transmission component 702 the names of targets that were not used and possibly any reasons why they were not used.

Figure 8:
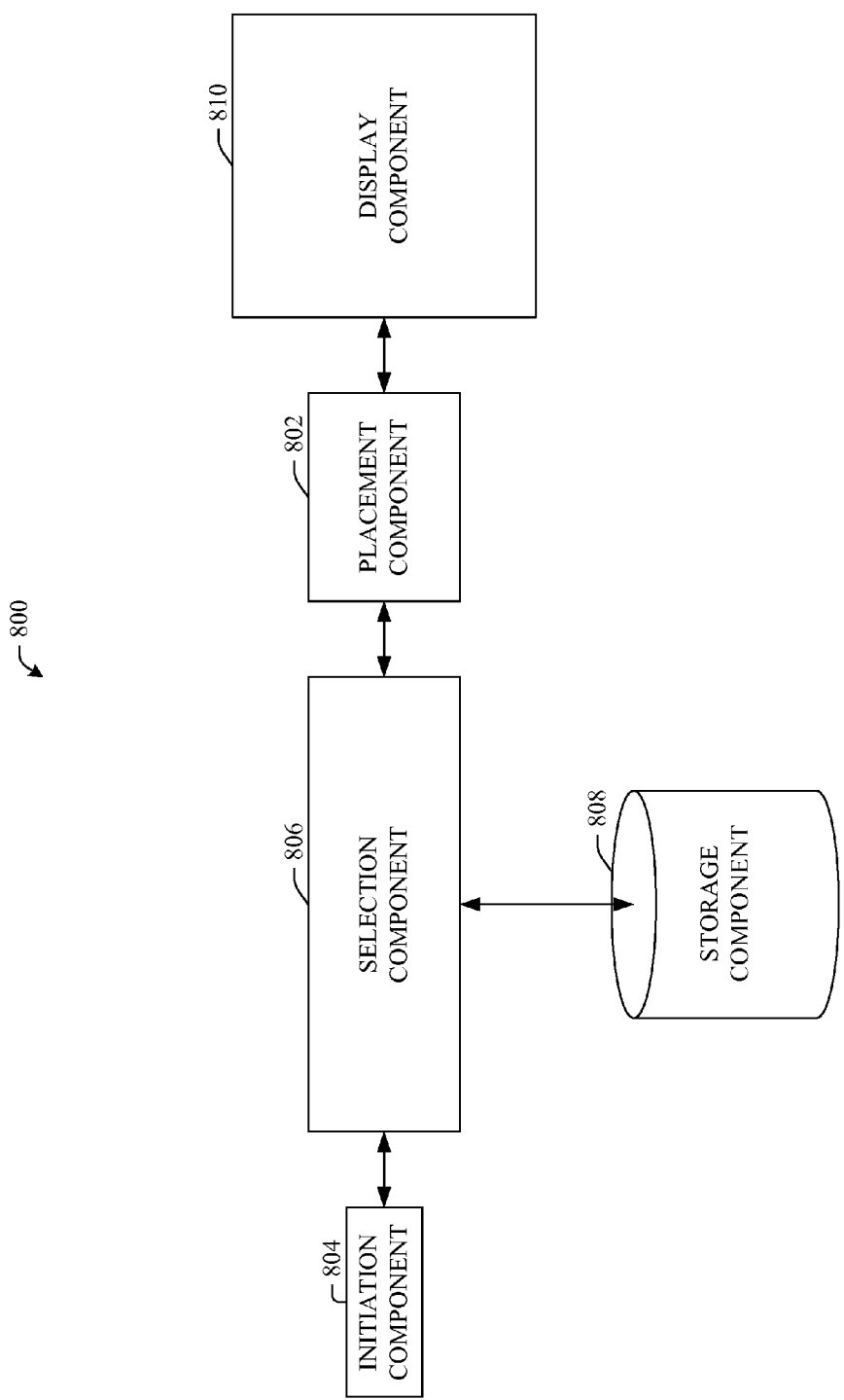
FIG. 8 illustrates an example system with a placement component in accordance with an aspect of the subject specification.

FIG. 8 discloses an example system 800 with a placement component 802. An initiation component 804 outputs a command to a selection component 806 that it should create a target division. The selection component 806 accesses an array of targets from a storage component 808 and creates a target division. The target division passes through a placement component 802. The placement component 802 determines a best arrangement for displaying the target division. Once the placement component 802 determines the arrangement, a display component 810 displays the target division in the arrangement from the placement component 802.

In one embodiment, the placement component 802 not only determines an arrangement, but also determines size of specific targets. For example, a user can be filling out a form that requires the entry of a six-digit date (e.g., mm/dd/yy). When using this configuration, it is likely known that a user will use a '0' or a '1' target fairly often because conventional 'mm' entries start with a '0' or a '1'. Therefore, the placement component 802 can determine that these targets should be slightly bigger then other targets, since there is a chance they will be contacted more often.

Figure 9:
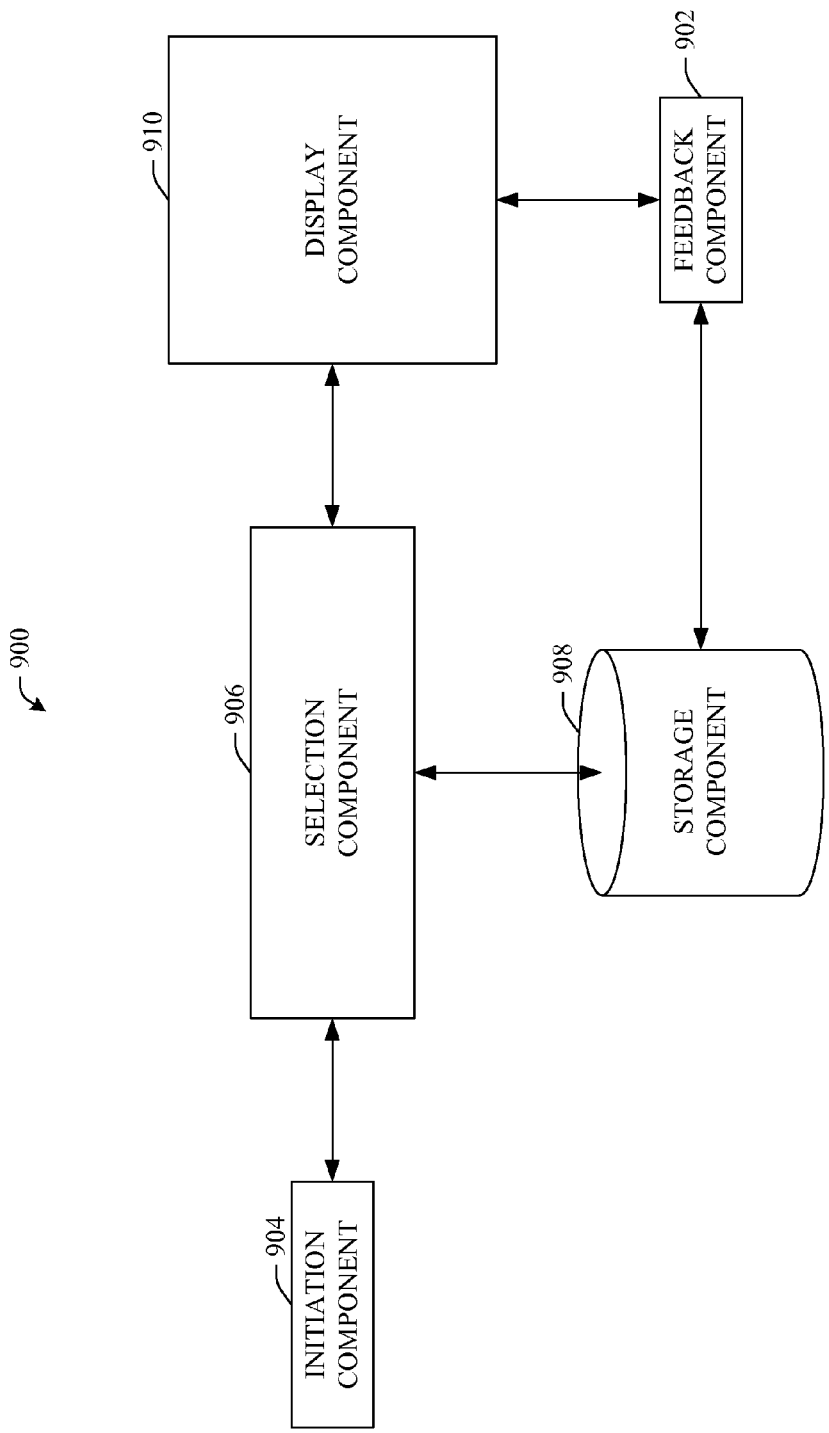
FIG. 9 illustrates an example system with a feedback component in accordance with an aspect of the subject specification.

FIG. 9 discloses an example system 900 with a feedback component 902. An initiation component 904 sends a command to a selection component 906 to create a limited target set. The selection component retrieves targets from a storage component 908 and commonly creates a limited target set from retrieved targets. The limited target set transfers to a display component 910 that displays the limited target set to a user. A feedback component 902 can ask a user their opinions of a displayed target set. Many of the responses of the user are stored in the storage component 908. The selection component 906 can have the capability of editing its selection logic based on the responses from the feedback component 902.

In one embodiment, the feedback component 902 operates when the user completes a usage of a provided display. The feedback component 902 can provide a series of questions to a user about the display or other information. For example, the feedback component 902 can ask a user if the arrangement of targets was easy to use. Responses to these feedback questions can be stored in a storage component 908. Furthermore, feedback questions can cascade off one another. For example, a user is a first question. The feedback component 902 picks a second question based on an answer to the first question (e.g., first question: 'Was it easy to use?', first answer: 'No', second question: 'Why was it not easy to use?'). In addition, questions presented by the feedback component 902 can be close ended (e.g., yes/no are the two answer choices) or they can be open ended (e.g., describing an answer in detail).

Figure 10:
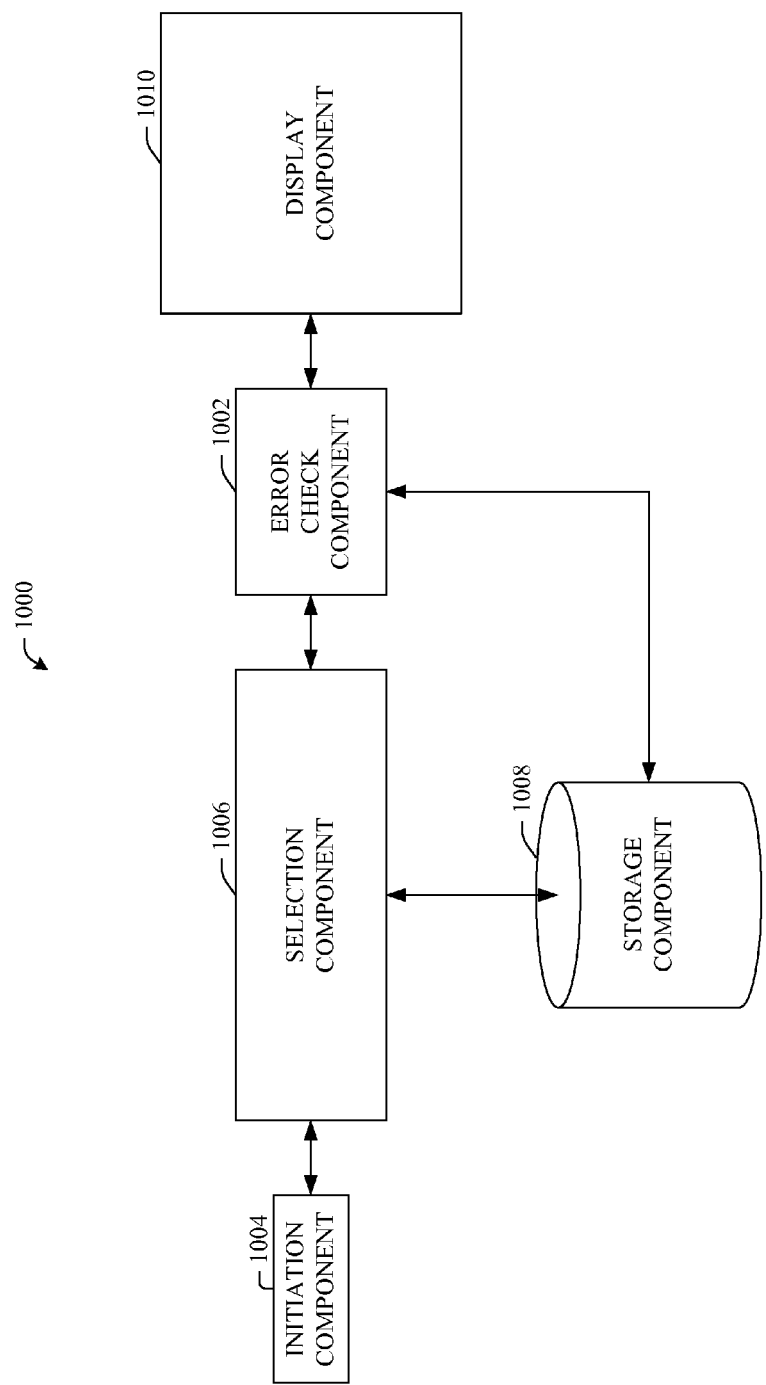
FIG. 10 illustrates an example system with an error check component in accordance with an aspect of the subject specification.

FIG. 10 discloses an example system 1000 with an error check component 1002. An initiation component 1004 sends a command to a selection component 1006 to choose a limited target set to ultimately display to a user. The selection component 1006 selects a subset of targets from a storage component 1008. An error check component 1002 attempts to determine errors in selection and display. For example, a retrieved target from the storage component 1008 could have been corrupted and will be displayed incorrectly (e.g. target code displays '2', but engaging the target inputs a '3'). The error check component 1002 can attempt to correct a discovered error of it can simply make a log in the storage component 1008 that it discovered an error, as well as take other approaches. A limited target sets displays to a user through a display component 1010. The error check component 1002 can keep checking the limited target set while it is on display through the display component.

In another embodiment, the error check component 1002 can check for other system 1000 errors in displayed components. For example, if the initiation component 1004 receives an instruction to send a command, but it fails to do so, then the error check component 1002 can respond to the failure. The error check component 1002 can both attempt to repair any encountered errors as well as store logs about errors or attempts to fix an error in a storage component 1008. In addition, the error check component 1002 can integrate with other checking components for a device.

Figure 11:
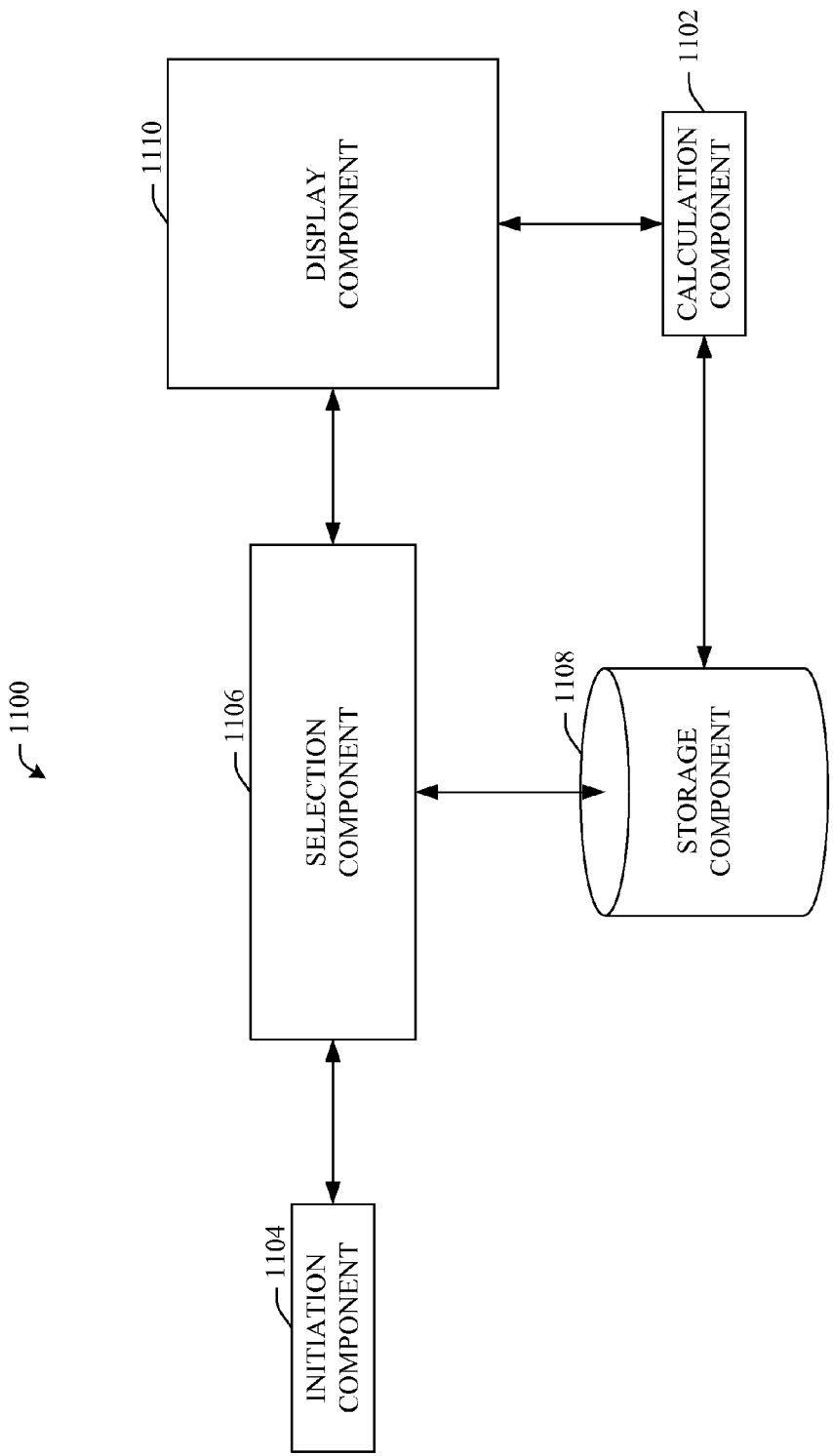
FIG. 11 illustrates an example system with a calculation component in accordance with an aspect of the subject specification.

FIG. 11 discloses an example system 1100 with a calculation component 1102. An initiation component 1104 sends an instruction to a selection component 1106 to create a limited target set. The selection component 1106 retrieves specific targets from a storage component 1108 to use in the limited target set. A limited target set is presented to a user through a display component 1110. A calculation component 1102 determines information about a users interaction with a limited target set and commonly saves the results of the determination on a storage component 1108.

For example, the calculation component 1102 can record the amount of time between user contacts of various targets. The selection component 1106 can use this information in determining efficiency of a particular target set. At later times, when a selection component 1106 makes choices for a limited target set, it can rely on data provided by the calculation component 1102. The calculation component 1102 can also configure to make suggestions to the selection component 1106 as to what could be a more effective target set arrangement.

The features of the components disclosed in the subject specification are designed to integrate together in various aspects. Various combinations of these components can take place to achieve different levels of functionality. In addition, features disclosed in one component can carry over to other like named component (e.g., the features of the initiation component 904 in FIG. 9 also apply to the features of the initiation component 1004 in FIG. 10). Features disclosed in methodologies in the subject specification can be carried over to appropriate components and visa versa.

Figure 12A:
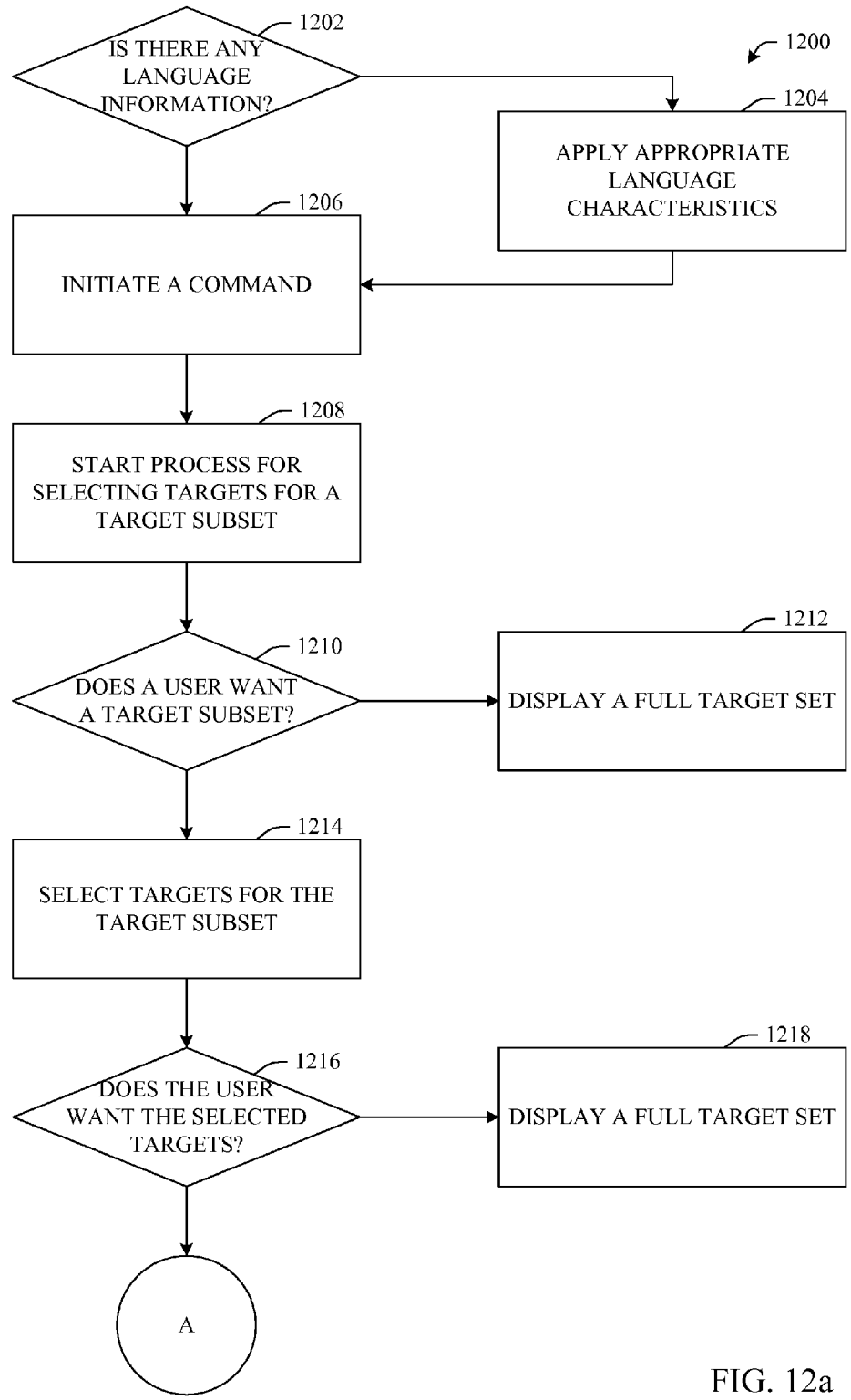
FIG. 12a illustrates a first part of an example methodology in accordance with several aspects of the subject specification.
Figure 12B:
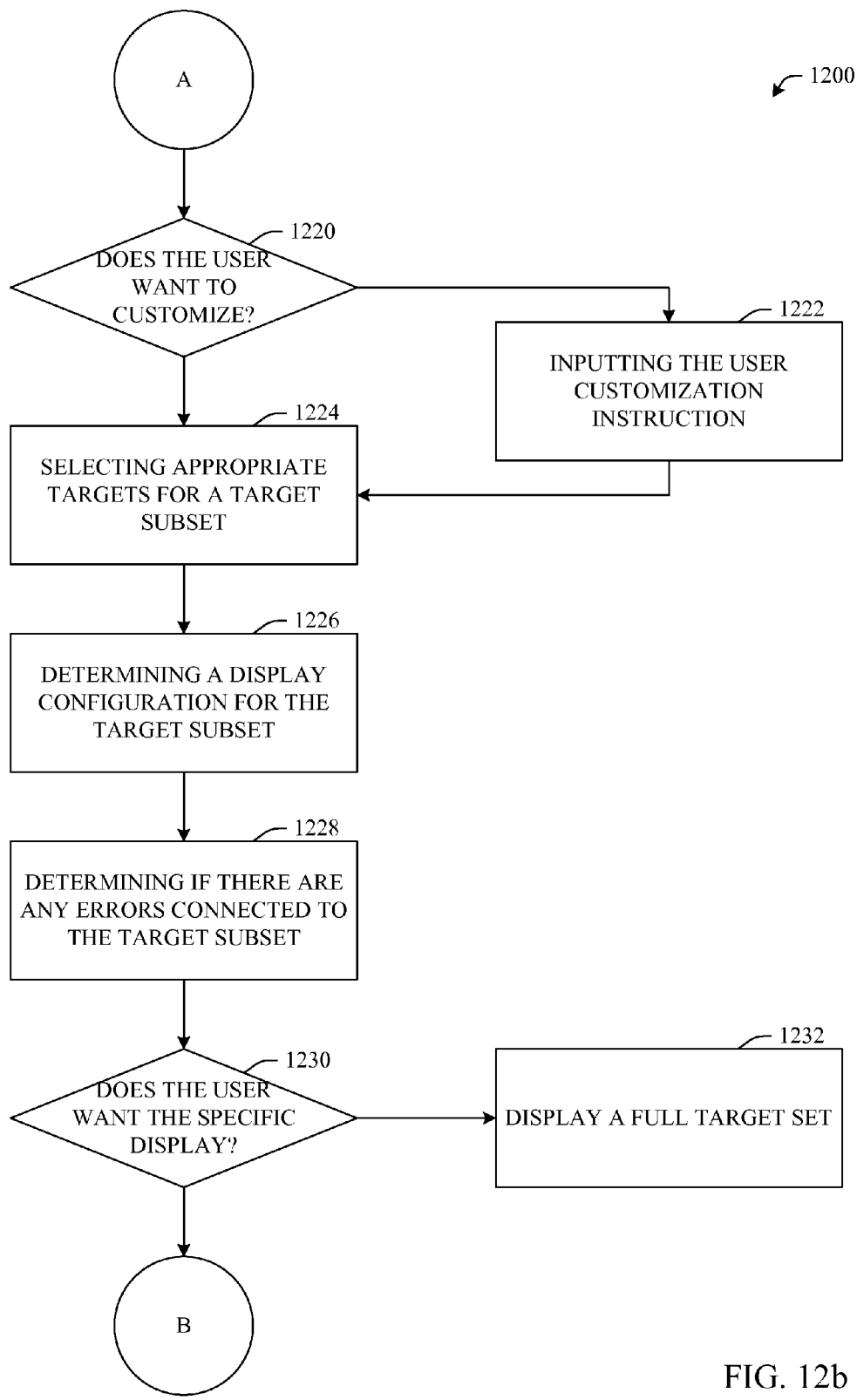
FIG. 12b illustrates a second part of an example methodology in accordance with several aspects of the subject specification.
Figure 12C:
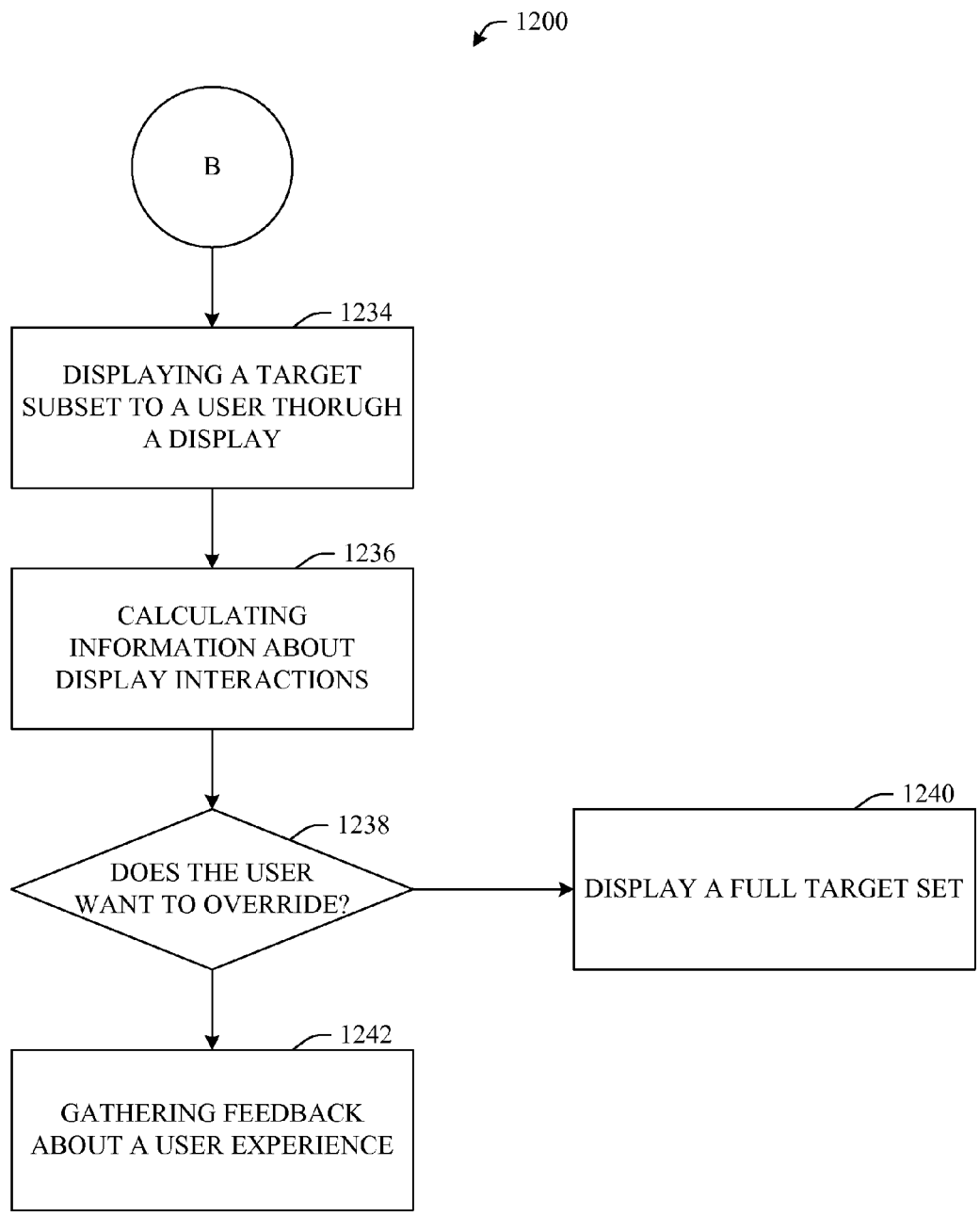
FIG. 12c illustrates a third part of an example methodology in accordance with several aspects of the subject specification.

FIG. 12a-FIG. 12c disclose an example methodology 1200 practicing some aspects of the subject specification. A language check takes place determining if there are any language characteristics that should take place 1202. For example, a user may speak in Polish making a request for a limited target set. A determination can take place as to what characters should be displayed in the limited target set based on the language spoken. If the there is language information, then a selection component can consider this information 1204. If there is no specific language information, then the methodology can continue.

Action 1206 is a command to initiate a start of a process for selecting and displaying a limited target set. In common operation, an initiation component sends information to a selection component about selecting a target subset. An example of an initiation is a user scanning a bar code with a device that possesses the ability to enact the subject specification. The selection component starts a process for choosing a limited target set 1208. A process start can take a number of different forms. For example, the selection component can send out a probe to determine if a limited target set is even capable. In a given configuration, it is possible that only one target is available for a given display and there is no way of increasing target size.

The methodology can check before going forward with any actual selection if a user would like a target subset displayed 1210. It would be a waste of resources if the methodology would continue if the user had no desire for a limited subset. Therefore, if the user states that he/she does not want a limited target subset displayed, then a system displays a full target set 1212. If the user wants a limited target subset, then a selecting component selects targets for a subset 1214. Selecting can take place based on a variety of information. In one embodiment, language information obtained in action 1204 can be used in selecting the target subsets. In another embodiment, environmental information based on a user activity (e.g., an activity of being located in a warehouse) can be used to select targets for a limited target subset.

It is possible for a selection component to ask a user if they want a select target 1216. This action can take place in a number of different circumstances. In one embodiment, each selection made by a selection component is presented to a user for user approval. In another embodiment, a set of targets are presented to a user for their approval. This set can be a provisional subset that could be presented to the user or only a portion of a possible subset. If the user rejects a disclosed subset, then the full target display can be presented 1218. However, it is possible for other configurations. For example, users can reject individual targets and only after a certain number of rejections (e.g., ten rejections) a full target set is displayed 1218.

Action 1220 determines if the user wants to customize the limited target set. A user can have a variety of options in customization. For example, a user can select an overall size for a target display or select specific targets that should be in the limited target set. Event 1224 selects appropriate targets for the limited target set. This act can use various amount of information in ultimately selecting the targets that should be included in the sample target set. Furthermore, these targets could be the targets presented to the user in action 1216.

Action 1226 selects the configuration of the targets to be displayed. This is commonly a physical orientation of targets. Error checking takes place on actions that relate to a limited target subset 1228. This action can cover an array of error checking. For example, it can include checking if there were any malfunctions concerning an initiation of selection. There can also be checks to make sure that a target has a correct representation (e.g., there can be an error that a target presents the character 'A', yet when a user contacts the target, it actually inputs the character 'B' into a system).

A user can again be asked if they would like to use a limited target set 1230. At this action, it is likely that the ultimate display that will be presented is known. This allows the user to make a more informed decision then in previous checks because more is known about the display that will appear. A user has the ability to reject the limited target display and select for a full target set 1232.

A presentment is made of a final limited target set to a user 1234. A target subset can have any number of targets or combinations. The target subset should be designed for increasing user productivity during a user activity within a user environment. While a user operates with the limited target set, calculations should be made of the interaction the user has with the limited target set. For example, the amount of targets a user engages over a specific period. A user can have a right to override the use of the target subset 1238 and revert to using a full target set 1240. In addition, a user can also submit feedback on the experience of using a limited target subset 1242.

FIG. 13 discloses sample display target configurations in accordance with at least some of the aspects disclosed in the subject specification. An example full target display 1300 has seventy-five targets. Not all targets are the same size although many of the targets are square and of equal size. A user can be engaged in an activity that he/she should enter information in hexadecimal format. An initiation component can recognize that this is an activity that would benefit from limited target set. The initiation component sends an instruction to a selection component that it should create a limited display. The selection component can retrieve target information from a storage component and creates a limited target display 1302, which emerges as a configuration of twenty-five targets, a reduction of two-thirds from display 1300. The limited target display 1302 appears to a user through a user interface.

Several advantages of the limited display can be observed by a comparison of 1300 and 1302. First, the average target size in 1302 is several times larger then the average target size of 1302. This gives a user a greater chance of making a successful contact with a desired key because there is a larger area to contact. In addition, the overall size of characters on the targets of 1302 is larger. Larger character size allows for a greater likelihood of a user being able to identify a target correctly. In another embodiment, average target size could stay the same for targets in the limited target set 1302. The smaller targets would allow for more screen space for other applications on a display screen.

Figure 14:
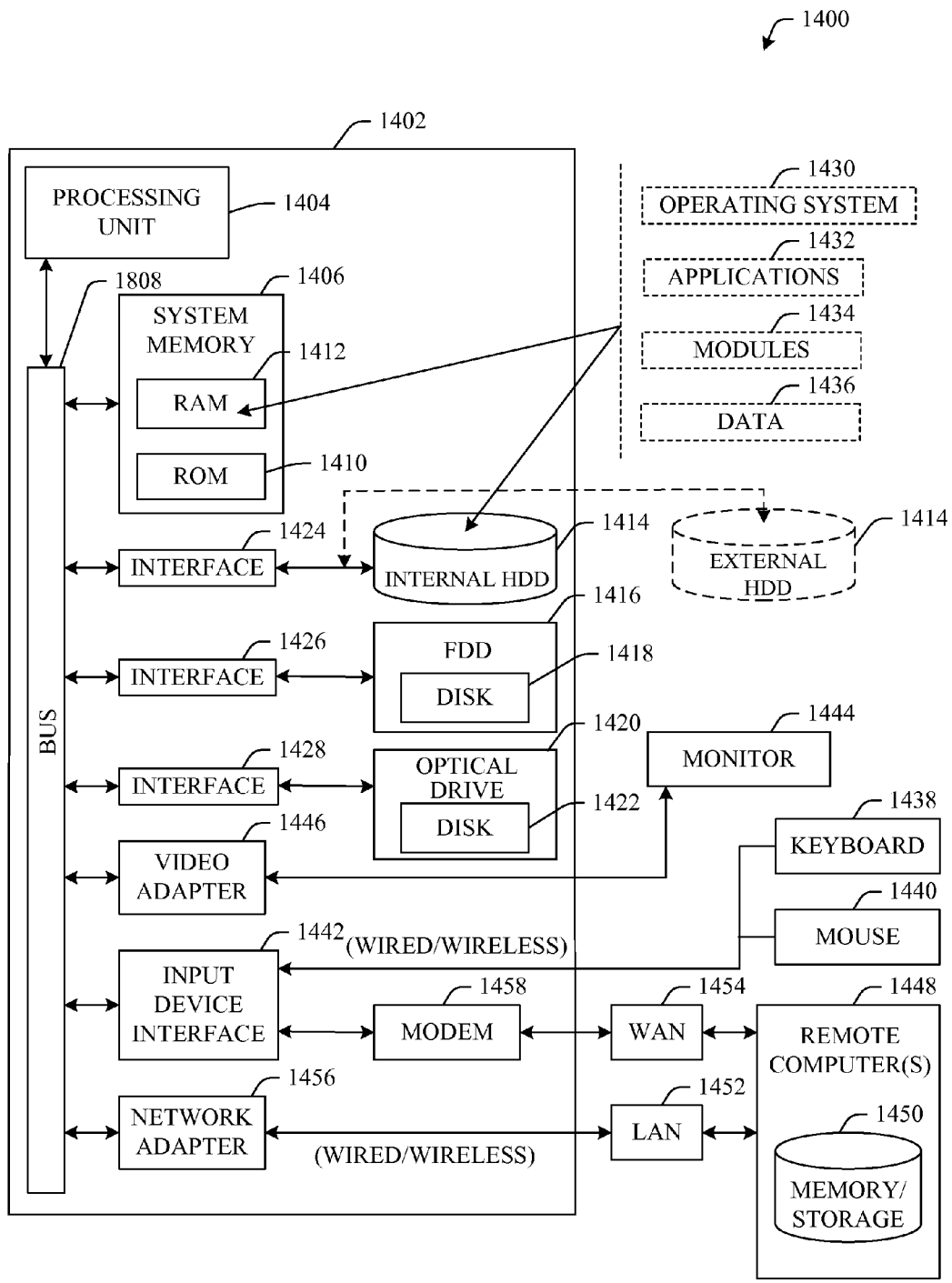
FIG. 14 illustrates an example of a block diagram of a computer operable to execute the disclosed architecture.

Referring now to FIG. 14, there is illustrated a block diagram of a computer operable to execute the disclosed architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g. a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
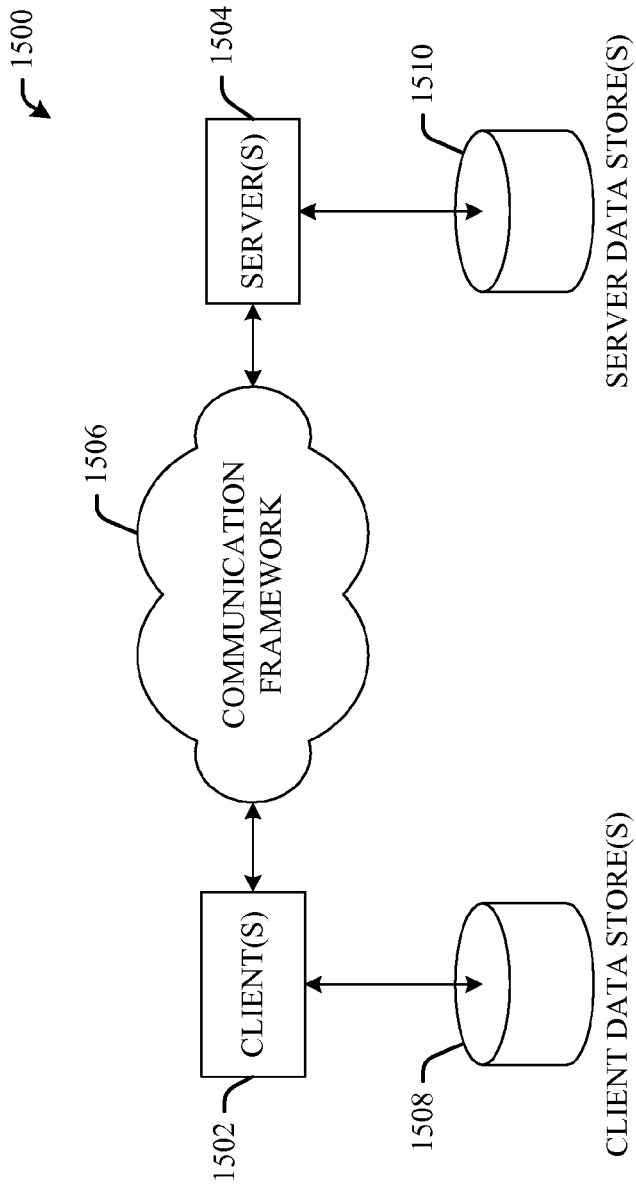
FIG. 15 illustrates an example of a schematic block diagram of a computing environment in accordance with the subject specification.

Referring now to FIG. 15, there is illustrated a schematic block diagram of a computing environment 1500 in accordance with the subject specification. The system 1500 includes one or more client(s) 1502. The client(s) 1502 can be hardware and/or software (e.g., threads, processes, computing devices). The client(s) 1502 can house cookie(s) and/or associated contextual information by employing the specification, for example.

The system 1500 also includes one or more server(s) 1504. The server(s) 1504 can also be hardware and/or software (e.g., threads, processes, computing devices). The servers 1504 can house threads to perform transformations by employing the specification, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The features of the components disclosed in the subject specification are designed to integrate together in various aspects. Various combinations of these components can take place to achieve different levels of functionality. In addition, features disclosed in one component can carry over to other like named component (e.g., the features of the initiation component 904 in FIG. 9 also apply to the features of the initiation component 1004 in FIG. 10). Features disclosed in methodologies in the subject specification can be carried over to appropriate components and visa versa.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for displaying a subset of input targets, each input target for display as a key of a digital keyboard, comprising:
    a storage component that stores an indication of the input targets, the input targets having a standard arrangement, each input target having a standard size and corresponding to a grapheme that is displayed as a key of the digital keyboard and that is input when that key is engaged by a user;
    a memory storing computer-executable instructions of:
        a customization component to receive input from the user regarding which input targets are to be included in the subset of the input targets to be displayed;
        a calculation component to track user interactions with a limited target set of input targets that are displayed to the user as keys of the digital keyboard and record information relating to the tracked user interactions;
        a selection component to identify the subset of input targets based on input received by the customization component and from the user interactions with the limited target set tracked and recorded by the calculation component, the subset of input targets not including all of the input targets, the subset of input targets being identified taking into consideration user interactions with the displayed limited target set of input targets such that the subset of input targets is different from the limited target set of input targets;
        a placement component that determines an arrangement for the subset of input targets, the determined arrangement being different from the standard arrangement; and
        a display component that presents the subset of input targets as a display of the digital keyboard that includes a key for each input target of the subset of the input targets; and
    a processor for executing the computer-executable instructions stored in the memory.

2. The system of claim 1, further comprising an override component that allows for elimination of presentment of the subset of input targets.

3. The system of claim 1, further comprising a request component that checks if the selection component should select the subset of input targets.

4. The system of claim 1, further comprising a language recognition component that supplies language information to the selection component for use in selection of the subset of input targets.

5. The system of claim 1, further comprising a feedback component that collects response of the user regarding interaction with the subset of input targets.

6. The system of claim 1, further comprising an error check component that checks if any of the subset of input targets are corrupt in the storage component and will display incorrectly.

7. The system of claim 1, wherein, the calculation component records an amount of time between contacts of the user with various targets in the subset of input targets.

8. The system of claim 1, further comprising a transmission component that allows the selection component to communicate with another device.

9. A method for displaying a subset of input targets having a standard arrangement in a non-standard manner, each input target to be displayed as a key of a digital keyboard, the method, comprising:
    determining whether a user wants to display the input targets or to display a subset of the input targets on a display screen;
    when it is determined that the user wants to display the input targets, displaying the input targets in the standard arrangement on the display screen as keys of the digital keyboard; and
    when it is determined that the user wants to display a subset of the input targets,
        selecting a subset of input targets to display, the subset being selected taking into consideration user interaction with a previously displayed subset of input targets such that the subset of input targets is different from the previously displayed subset of input targets, the input targets of the subset of input targets corresponding to graphemes;
        selecting a system-added target input that is of general use with the user-selected subset of the input targets wherein the subset of the input targets includes the user-selected subset of the input targets and the system-added target input;
        determining an arrangement of the subset of input targets based on size of the display screen;
        provisionally displaying the subset of input targets in the determined arrangement;
        asking the user to confirm the determined arrangement of the subset of input targets through the provisional displaying of the subset of the input targets as keys of the digital keyboard; and
        after the user confirms the determined arrangement, displaying the subset of the input targets in the determined arrangement on the display screen as keys of the digital keyboard.

10. The method of claim 9, further comprising checking if any of the subset of input targets are corrupt in a storage component and will display incorrectly.

11. The method of claim 9, further comprising recording an amount of time between contacts of the user with various targets in the subset of input targets.

12. The method of claim 9, further comprising calculating information about interaction with the subset of input targets.

13. The method of claim 9, further comprising collecting feedback from the user regarding experience with interaction with the subset of input targets.

14. A computer memory storing computer-executable instructions for controlling a computer to display a subset of input targets, the input targets having a standard arrangement, the subset of the input target to be displayed in a non-standard arrangement, the computer-executable instructions comprising:

instructions that determine whether to display the input targets or to display a subset of the input targets on a display screen;
  instructions that, upon determining to display the input targets, display the input targets in the standard arrangement on the display screen;
  instructions that, upon determining to display a subset of the input targets,
    select a new subset of the input targets to display, the new subset being selected taking into consideration user interactions with a previously displayed subset of the input targets such that the new subset is different from the previously displayed subset, the input targets of the new subset of the input targets corresponding to graphemes; and
  selecting a system-added input target that is of general use with the new subset of the input targets;
  display as keys of a digital keyboard the new subset of the input targets and the system-added input target in the non-standard arrangement, the keys of the input targets of the new subset of inputs targets indicating the corresponding graphemes, and
  when a user engages a key corresponding to an input target of the new subset of the input targets, displaying the corresponding grapheme in an area of the display separate from the displayed digital keyboard.

15. The computer memory of claim 14 including instructions that generate an arrangement of the new subset of the input targets based on user interactions with a previously displayed subset of input targets.

16. The computer memory of claim 14 wherein the system-added input target is a closing target.

* * * * *